United States Patent [19]
Lang et al.

[11] Patent Number: 4,979,026
[45] Date of Patent: Dec. 18, 1990

[54] POLARIZED LIGHT 360 DEGREE VIEWING SYSTEM

[76] Inventors: Paul W. Lang; Franklin C. Gribshaw, both of P. O. Box 7194, Orange, Calif. 92613

[21] Appl. No.: 410,127

[22] Filed: Sep. 20, 1989

Related U.S. Application Data

[63] Continuation-in-part of Ser. No. 326,173, Mar. 17, 1989, which is a continuation-in-part of Ser. No. 320,289, Mar. 7, 1989.

[51] Int. Cl.$^5$ .............................................. H04N 9/16
[52] U.S. Cl. ....................................... 358/64; 358/87; 350/331 R
[58] Field of Search ...................... 358/61, 64, 87, 232; 350/130, 111, 144, 273, 274, 33 R, 334

[56] References Cited

U.S. PATENT DOCUMENTS

3,335,217  8/1967  Bassett .
3,542,948  11/1970 Wolff .
3,647,284  3/1972  Elings et al. .
3,692,934  9/1972  Herndon ................................. 358/87
3,976,837  8/1976  Lang .
3,992,718  11/1976 Driskell ................................. 358/61
4,901,140  2/1990  Lang et al. ............................ 358/87

Primary Examiner—James J. Groody
Assistant Examiner—Kim Yen Vu
Attorney, Agent, or Firm—Kelly, Bauersfeld & Lowry

[57] ABSTRACT

A viewing system is provided for presenting a real image in space that is rotated extremely rapidly so that an entire audience, regardless of an individual's position about the viewing system, can view the same image substantially simultaneously and continuously. An electronic image rotation system distorts, processes and rotates an image upon a cathode ray tube (CRT), and a parabolic mirror arrangement projects the image from the CRT to provide a rotating real image in space. A rotatable polarized screen and a separate, stationary polarized screen cooperate to define a viewing window which remains continually aligned with the rotating real image in space.

22 Claims, 5 Drawing Sheets

POLARIZED LIGHT 360 DEGREE VIEWING SYSTEM

RELATED APPLICATIONS

This application is a continuation-in-part of application Ser. No. 07/326,173, filed Mar. 17, 1989, and entitled SOLID STATE 360° VIEWING SYSTEM, which is a continuation-in-part of application Ser. No. 07/320,289, filed Mar. 7, 1989, and entitled 360° VIEWING SYSTEM.

BACKGROUND OF THE INVENTION

This invention relates to image projection and television viewing systems. More particularly, this invention relates to a method and apparatus for enabling a centrally located televised picture to be viewed substantially simultaneously by an audience surrounding the picture over 360°.

The general problem in the display of a picture print, a television image or a projection onto a screen is that the picture is best viewed when the viewer's line of sight is precisely normal to the plane of the picture. This ideal condition is difficult to realize when several people wish to view the picture simultaneously from varied locations.

One solution to this problem is to simply mount the picture on a rotating pedestal which will slowly rotate over 360°, permitting several people surrounding the pedestal to eventually view the picture in a line of sight normal to the plane of the picture. Such systems are often used in advertising displays within large areas such as railroad stations and the like. A problem with such an arrangement is that the rotation of the picture must be relatively slow in order to permit the various viewers to have an opportunity to study the picture. Such a slow rotation means that essentially only a few people at a time are viewing the picture while others out of the line of sight must wait until the picture comes into view.

There are many instances in which several people may wish to view a picture or displayed data simultaneously and continuously so that they can all carry on a meaningful discussion concerning the displayed information. For example, during business meetings a group of executives typically sit around a conference table, an arrangement which does not readily enable information presented on the table to be displayed to all in attendance. A great benefit would be realized if a means centrally located on the table were available which would permit everyone present to examine a picture or projected data substantially simultaneously. For example, the necessity of passing among the members of the group pictures to be successively viewed would be avoided. In addition, the ability to display data through a 360° range would prevent members from looking at a series of pictures out of order, a potential problem if duplicate sets of pictures were to be provided to each individual member.

Another drawback associated with conventional display systems is that special consideration must be given to the positioning of the display within its environment because, typically, conventional display systems, such as a television, cannot be viewed from the rear or extreme sides. Thus, the area within which a viewing audience can be accommodated is limited to locations with suitable sight lines. As a result, use of the space available around the display system is often limited by the presence of blind spots. Moreover, the positioning of furniture within a room can disadvantageously be dictated by a need to provide clear sight lines to a television or the like.

In an attempt to overcome the viewing limitations associated with conventional displays, 360° viewing systems have been developed, an example of which is shown in U.S. Pat. No. 3,976,837. Although such prior 360° viewing systems have provided significant advancements over the prior art, additional features have been considered desirable in order to provide a more commercially acceptable product. For example, in some applications it may be desirable to minimize the moving parts of the system.

There exists, therefore, a need for a visual display system that will enable an entire audience to view a televised picture simultaneously, regardless of an individual's location around the display system. Additionally, an improved 360° viewing system is needed which utilizes a stationary cathode ray tube and optical means to rotate a projected image in space. Such a system would preferably be of simplified construction and would maximize the size of the projected image with respect to the overall physical housing for the viewing system. Moreover, a 360° viewing system is needed which provides a novel shutter arrangement that tracks the projected image in space as it is caused to rotate. The present invention fulfills these needs and provides further related advantages.

SUMMARY OF THE INVENTION

In accordance with the invention, a solid state 360° viewing system is provided for enabling a televised picture to be viewed substantially simultaneously by an audience surrounding the picture over 360°. The novel 360° viewing system utilizes a cathode ray tube (CRT) which provides a rotating image, and an optical system which projects the rotating image to create a real image in space. The 360° viewing system also utilizes a polarized light shutter including means rotatable with the rotating image in space, for polarizing the light of the real image in space, and a stationary polarized screen. The stationary polarized screen, together with the means for polarizing the light of the real image in space, presents a normally opaque shutter system wherein a window is formed in the stationary polarized screen as the polarities of the stationary screen and the polarized light of the image align with one another.

The 360° viewing system has a broad range of applications, including advertising marquees, television sets and display screens for presenting travel information at airports, train stations and bus depots. The present invention advantageously enables information to be communicated simultaneously to a large audience because a 360° display is presented which maximizes sight lines to the viewing system and minimizes blind spots. This feature beneficially allows great flexibility in the positioning of furniture and the viewing system within a viewing area, thereby providing greater freedom of choice in the utilization of space within the viewing area.

In accordance with a preferred form of the invention, a stationary means for creating an image, preferably a cathode ray tube (CRT), is disposed within a housing. An optical system including first and second concave mirrored surfaces, projects the image from the CRT to create a real image in space. Preferably, the optical system comprises a pair of a centrally apertured, facing parabolic mirrors disposed above the CRT, and a partially opaque plate positioned between the parabolic mirrors such that the CRT is not directly visible. The plate includes a transparent outer rim through which the first and second concave mirrored surfaces reflect light.

The image provided by the CRT is electronically rotated with an electronic image rotation system to cause the real image in space to likewise rotate. Rotation of the real image in space enables any viewer in the audience to periodically have a line of sight in alignment with a proper viewing angle for the real image in space. When the rotational rate in revolutions per minute is sufficiently great (preferably exceeding 900 rpm), and when a suitable shutter arrangement is used, all viewers surrounding the 360° viewing system will see the same picture substantially simultaneously and continuously.

The electronic rotation system utilizes a color processor circuit to separate red, green and blue (RGB) signals contained in a composite video input signal. These RGB signals are converted from an analog to a digital format and stored within a random access memory (RAM). An input address generation circuit provides the RAM with input from means for separating the composite video input signal into horizontal and vertical synchronization pulses. An output address generation circuit selects data stored in the RAM, according to an algorithm that creates a video output signal from the stored data.

An image recreated from the video output signal will appear to rotate on the CRT. To facilitate creation of the video output signal, first and second buffers are interchangeably used within the RAM such that one buffer is used to store the RGB signals while the other buffer is used in creating the video output signal. The output address generation circuit also distorts the recreated image in a manner causing the foreground to be narrower than the background.

The polarized light shutter includes a rotatable polarized screen which rotates in synchronization with the rotating real image in space, and a stationary polarized screen. The stationary polarized screen is positioned such that the real image in space may be viewed externally of the 360° viewing system only when the polarities of the two polarized screens match. Preferably, the rotatable polarized screen generally overlies the face of the CRT to intercept light emitted therefrom prior to reflection by the mirrors. A plurality of magnets are positioned about the periphery of the rotatable polarized screen, and are arranged to have alternating polarities. These magnets interact with an induction motor to turn the rotating polarized screen in synchronization with the rotating image on the CRT.

In one preferred form, the stationary polarized screen exteriorly surrounds the real image in space and is provided in a generally conical configuration. In another preferred embodiment, the stationary polarized screen is situated between the pair of parabolic mirrors and is provided in a generally cylindrical configuration.

The polarized light shutter system continuously blanks out a backside/reversed view of the rotating image in space. This permits the real image in space to be viewed in a selected orientation at all points about the 360° viewing system, only as the polarities of the light of the real image in space matches with the polarity of the stationary polarized screen.

Although means are provided for electronically rotating the image provided by the CRT, the invention is equally applicable to a video input signal wherein the image has been pre-rotated during the recording process.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As shown in the drawings for purposes of illustration, the present invention resides in a 360° viewing system which enables a televised image to be viewed substantially simultaneously by an audience surrounding the picture. The 360° viewing system includes an optical system that projects an electronically rotated image from the face of a cathode ray tube (CRT), to create a real image in space that rotates so rapidly that all of the viewers can, in effect, view the same picture substantially simultaneously and continuously. Moreover, the present invention features novel use of a polarized light shutter which defines a viewing window relative to the real image in space that moves in synchronization with the electronic rotation of the image on the CRT.

The 360° viewing system of the present invention can be used in television sets, advertising marquees and in display screens for presenting travel information at airports, train stations, and bus depots. Another advantage of the solid state 360° viewing system is that it enables information to be displayed simultaneously to a large audience regardless of the positioning of the viewing system within an area, because a 360° display is provided which maximizes sight lines and minimizes blind spots caused by a misaligned orientation of a viewer with respect to the display. This feature provides greater freedom of choice in the positioning of the viewing system because, for example, furniture arrangements will no longer be dictated by sight line considerations.

In accordance with the present invention, and with reference to FIGS. 1 through 4, a stationary cathode ray tube (CRT) 10 having a magnetic yoke 12 is disposed within a housing 14. The CRT 10 receives signals for generating a television picture from electronic image rotation circuitry housed within a control box 16. The control box 16 receives a composite video input signal via a cable 18 secured to a connector 20 located on the exterior of the housing 14. A power cord 22 connects the solid state 360° viewing system to a suitable power supply. The CRT 10 is preferably vertically oriented within a chamber 24 of the housing 14, and remains stationary during operation of the system.

A pair of facing parabolic mirrors 26 and 26' (FIGS. 1 and 3), provide a first mirrored surface 28 and a second mirrored surface 30 disposed above the housing 14. The CRT 10 is aligned with apertures 32 and 34 within the lower mirror 26 and the upper mirror 26', respectively. The parabolic mirrors 26 and 26' project an image from the CRT 10 to create a real-image-in-space 36 which appears above the aperture 34. The real image in space 36 results from an optical pathway (see FIG. 1) whereby light rays 38 emanating from the CRT 10 impinge upon the first mirrored surface 28 of the mirror 26', are reflected to the second mirrored surface 30 of the mirror 26, and then are focused above the aperture 34 to form the real image in space 36. The real image in space 36 is "right reading," in that an image reversed by the first mirrored surface 28 is reversed back again by the second mirrored surface 30 so that the real image in space is virtually identical to the original image created on the CRT 10.

Figure 1:
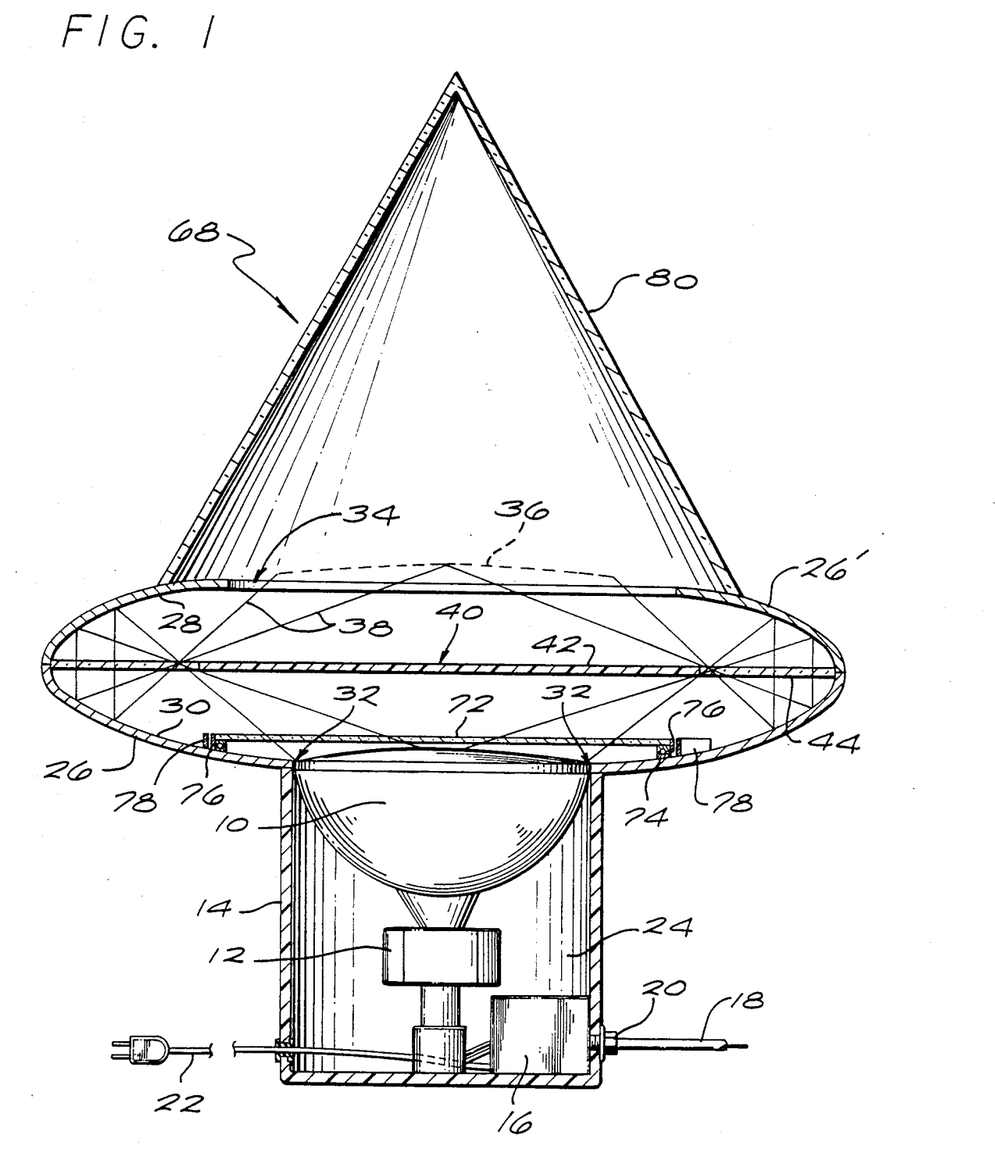
FIG. 1 is a cross-sectional view of a polarized light 360° viewing system embodying the invention and taken, for reference purposes, generally along the line 1—1 of FIG. 4, illustrating the positioning of a cathode ray tube (CRT) within a housing, the configuration and location of a pair of overlying, facing parabolic mirrors which create a real image in space, a rotatable polarized screen positioned over the face of the CRT, and a conical stationary polarized screen situated over the real image in space which, together with the rotatable screen, defines a window maintained in synchronous alignment with the real image in space.
Figures 2, 3, 4:
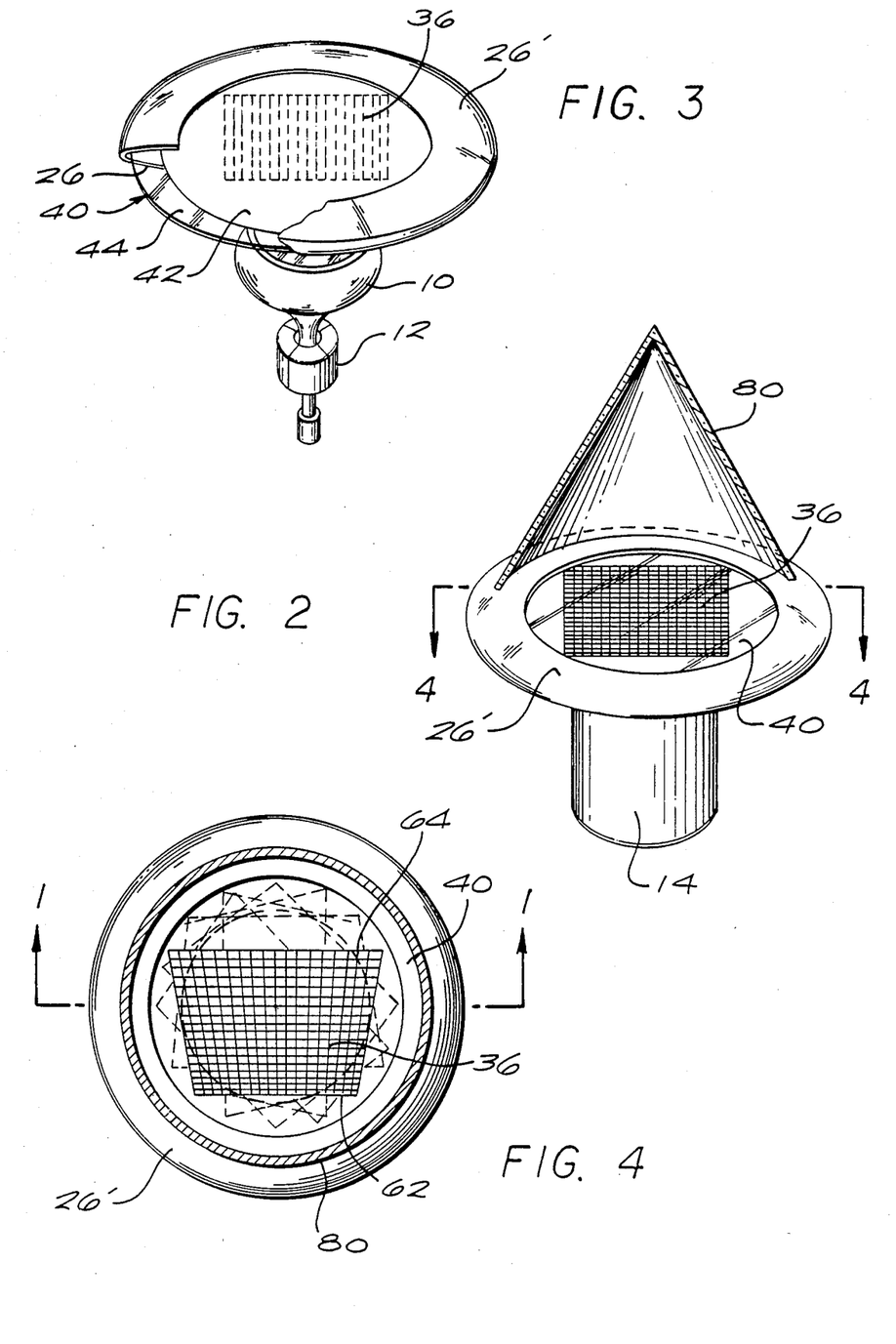
FIG. 2 is a perspective view of the polarized light 360° viewing system shown in FIG. 1.
FIG. 3 is a perspective view similar to that shown in FIG. 2, wherein the conical polarized screen and the housing for the cathode ray tube have been removed for purposes of illustration, and showing a portion of the parabolic mirrors cut away to illustrate the positioning of a partially opaque plate within the mirror arrangement.
FIG. 4 is a cross-sectional plan view taken generally along the line 4—4 of FIG. 2, illustrating the step-wise rotation of the real image in space and the magnitude of image distortion.

The parabolic mirrors 26 and 26' may be formed of any desired material, such as a polished metal, "silvered" materials, glass or any other highly reflective surface. Although the parabolic mirror arrangement shown is preferred, any other optical system capable of forming a real image in space may be used. The exact location of the real image in space 36 with respect to the aperture 34 through the upper mirror 26', is a function of the spacing between the mirrored surfaces 28 and 30, and their respective curvatures.

The real image in space 36 is preferably viewed at an angle of approximately 30 degrees. The optimum viewing angle is determined by the magnification provided by the optical system. In the preferred embodiment, the parabolic mirrors 26 and 26' are designed to magnify the CRT image by a factor of four.

A plate 40 is positioned within the facing mirror arrangement between the CRT 10 and the aperture 34. The plate 40 includes an opaque portion 42 which is at least as large as the face of the CRT 10. This opaque portion 42 of the plate 40 is provided to ensure that the CRT 10 will not be directly visible as an audience views the real image in space 36. The plate 40 further includes a transparent rim portion 44 through which the light rays 38 can pass as they travel along the above-discussed optical pathway.

The image formed on the CRT 10 is electronically rotated by an electronic image rotation system that imparts to the image a stepped spin movement (see FIG. 4) which occurs so fast that the image appears to be rotating continuously. Circuitry comprising the electronic image rotation system is housed within the control box 16. Rotation of the image upon the face of the CRT 10 causes the real image in space 36 to rotate as well. When the real image in space 36 is rotated at a speed of at least 900 revolutions per minute, each viewer in a circle surrounding the solid state 360° viewing system will see the real image in space 36 periodically, and due to the rapid rotation and use of a suitable shutter system (to be discussed below), all of the viewers surrounding the 360° viewing system can, in effect, view the same picture substantially simultaneously and continuously.

The electronic image rotation system electronically rotates the image upon the face of the CRT 10 after processing a composite input video signal into a separated format of red, green, and blue signals, and horizontal and vertical synchronization pulses. The image rotation system makes the image displayed by the CRT 10 appear to rotate by electronically storing the separated synchronization pulses and color data of the video input signal in a random access memory, and then processing the stored data to generate the image on the CRT 10 at various angles of rotation as schematically illustrated in FIG. 4.

Figure 5:
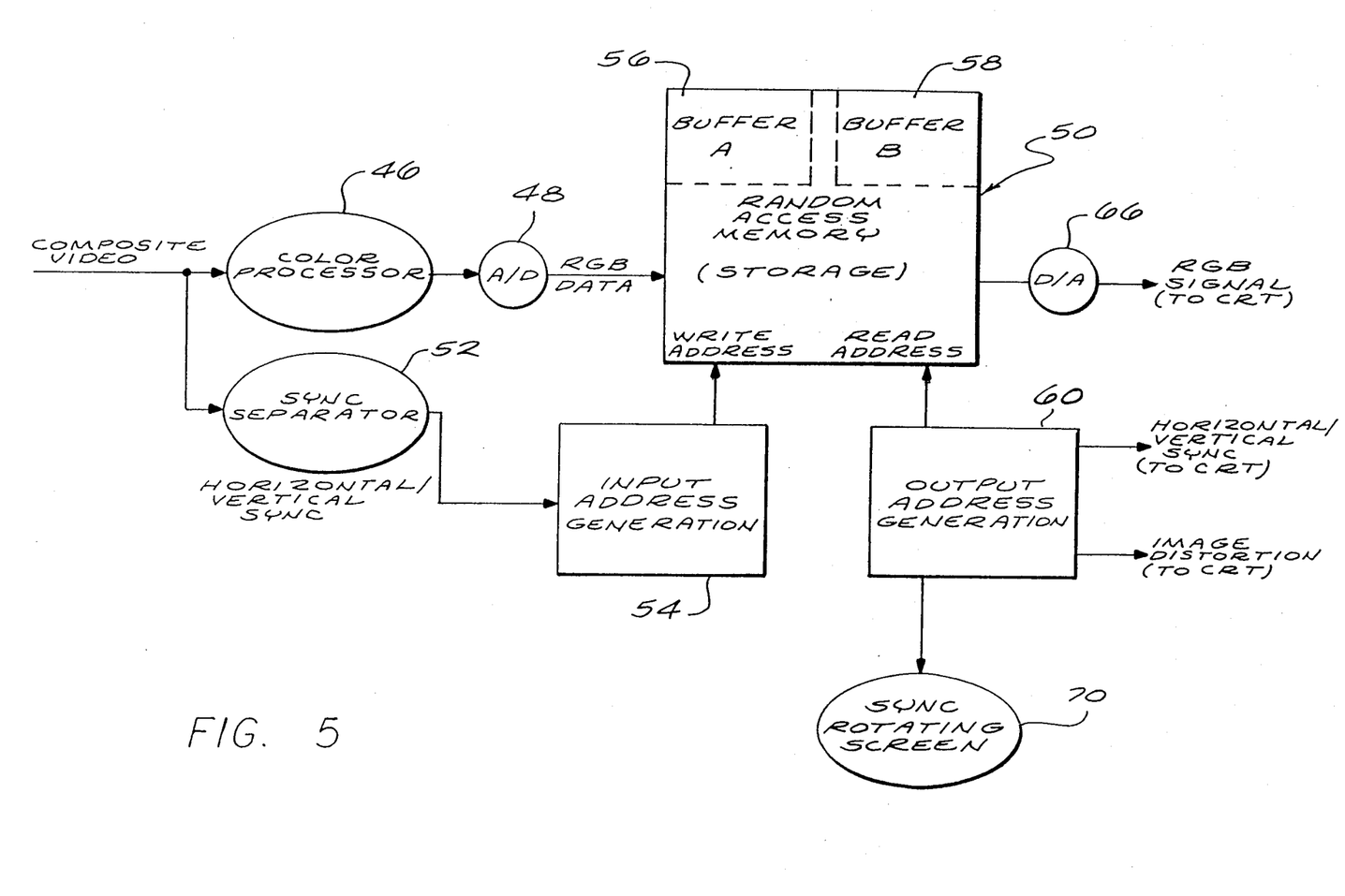
FIG. 5 is a logic diagram illustrating the processing of a composite video signal to create a stepped-rotating real image in space which moves in synchronization with the window provided by the polarized screens.

Referring now to the diagram of the image rotation system shown in FIG. 5, a color processor circuit 46 separates red, green and blue image data contained in the composite video input signal. These analog signals are converted to a digital format by an analog to digital converter 48. After being converted to a digital format, the red, green and blue image data is stored in a random access memory (RAM) 50. The composite video input signal is also separated into horizontal and vertical synchronization pulses by a sync separator circuit 52. The horizontal and vertical synchronization pulses provide input to an input address generation circuit 54, which dictates how digital information from the converter 48 is stored within the RAM 50.

The RAM 50 creates a buffer A 56 and a buffer B 58 which are alternately used for receiving/storing the incoming video signal and creating an outgoing rotated video signal. The digital red, green and blue image data is stored in the buffer A 56 while the buffer B 58 is used in creating the rotated video output signal. After the buffer A has been used for storage and the rotated output signal has been created in buffer B, the buffers A and B are interchanged in use such that color image data is stored in the buffer B while the buffer A is used in creating the rotated output signal. The buffers A and B alternate functions in this manner continuously. To facilitate the storage of received data in the RAM 50, the input address generation circuit 54 resets at the beginning of each video frame to select an initial, predetermined RAM location in either the buffer A or the buffer B for storage. This reset action is timed to coincide with every other vertical synchronization pulse inputted by the sync separator circuit 52 to the input address generation circuit 54.

An output address generation circuit 60 selects data stored in the RAM 50 accordingly to an algorithm which recreates a video output signal from the stored data. The output address generation circuit 60 electronically rotates the input image in a stepped fashion. This stepped rotation occurs at a sufficiently rapid rate (at least 900 rpm) so that the human eye only perceives continuous movement. The output address generation circuit 60 also utilizes the algorithm to distort the rotated video output signal such that a foreground edge 62 of the real image 36 projected from the CRT 10 will be narrower than a background edge 64 (FIG. 4). This has the effect of creating an optical illusion which makes a horizontal real image in space appear to be tilted vertically. The output address generation circuit 60 sends to the CRT 10 the rotated, distorted video output signal as well as a horizontal/vertical synchronization signal, in stepped pulses. The CRT 10 receives red, green and blue (RGB) signals from the RAM 50 via a digital to analog converter 66.

Viewing of the real image in space 36 is controlled by a polarized light shutter 68 which presents a window that rotates in synchronization with the rotating real image in space. The synchronization of the viewing window's location with the rotation of the real image in space 36 is provided by a sync rotating screen circuit 70, which receives input from the output address generation circuit 60.

In the embodiment illustrated in FIGS. 1 through 4, the polarized light shutter 68 includes a rotatable polarized screen 72 positioned adjacent to and overlying the face of the CRT 10. The rotatable polarized screen 72 is mounted on a circular bearing 74, and includes a plurality of permanent magnets 76 positioned about its periphery. These permanent magnets 76 are arranged to present alternating polarities outwardly for interaction with an induction motor 78. Activation of the induction motor 78 is precisely controlled by the sync rotating screen circuit 70 in order to rotate the rotatable polarized screen 72 in synchronization with rotation of the image on the CRT 10.

Positioned above the real image in space 36 and resting upon an upper surface of the upper mirror 26' is a stationary polarized screen 80. The illustrated stationary polarized screen 80 has a generally conical configuration, and the polarizing axis of the stationary polarized screen should match the polarizing axis of the rotatable polarized screen 72. These two polarized screens 72 and 80 accomplish the same purpose as the LCD screen 60 of our prior application Ser. No. 07/326,173, filed Mar. 17, 1989 and entitled SOLID STATE 360° VIEWING SYSTEM (the contents of which are incorporated herein by reference), in that the polarized screens cooperate to define a rotating window which permits the real image in space 36 to be viewed only when the polarities of the two screens match. This has the effect of insuring that the real image in space 36 is only viewed in a desired upright orientation, as the polarization of the two screens, when they do not match, tends to black-out the real image in space 36.

Figure 6:
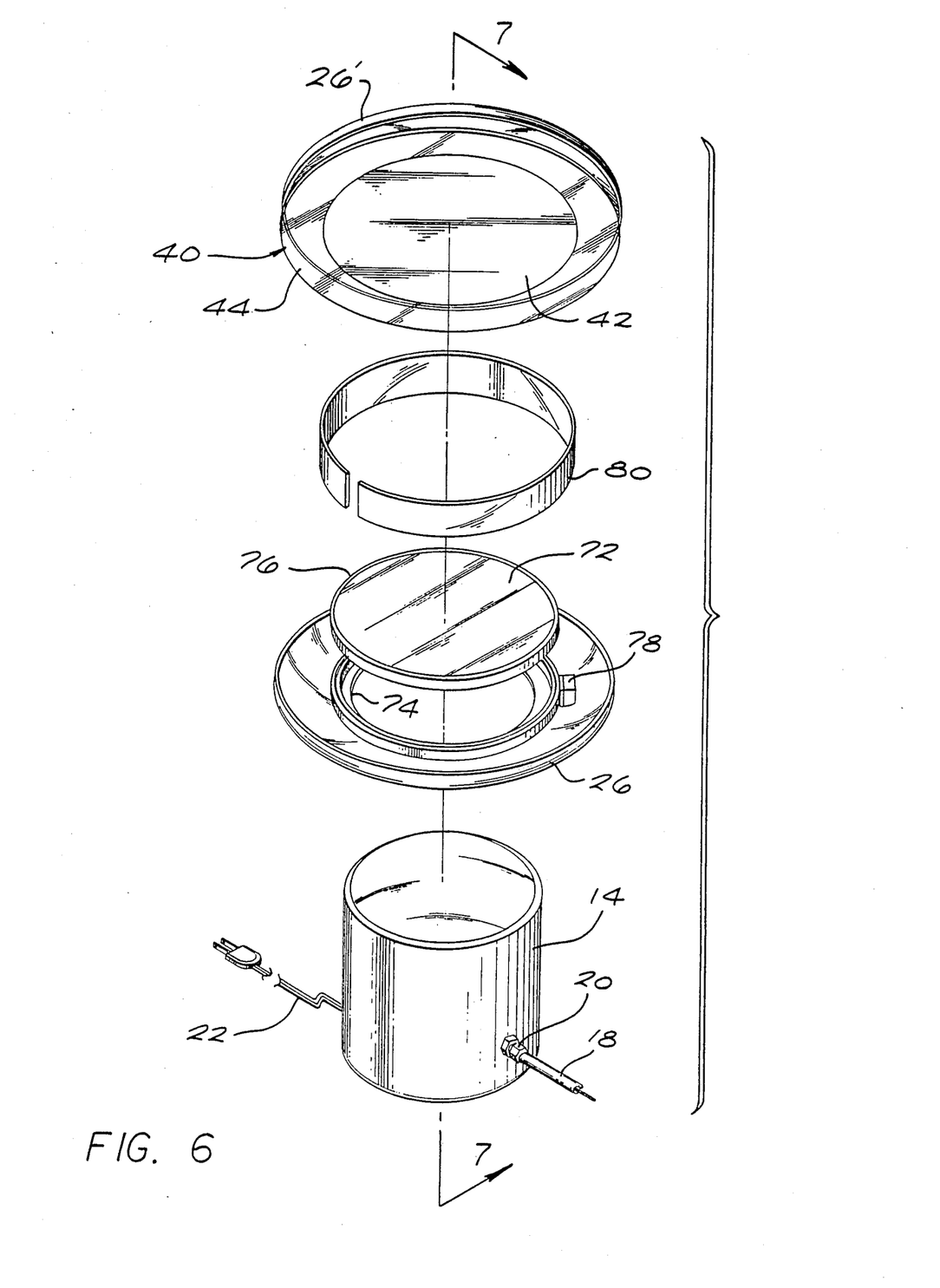
FIG. 6 is an exploded perspective view of a second embodiment of a polarized light 360° viewing system embodying the invention, illustrating the substitution of a cylindrical stationary polarized screen within the mirror arrangement, for the conical stationary polarized screen of FIG. 1.
Figure 7:
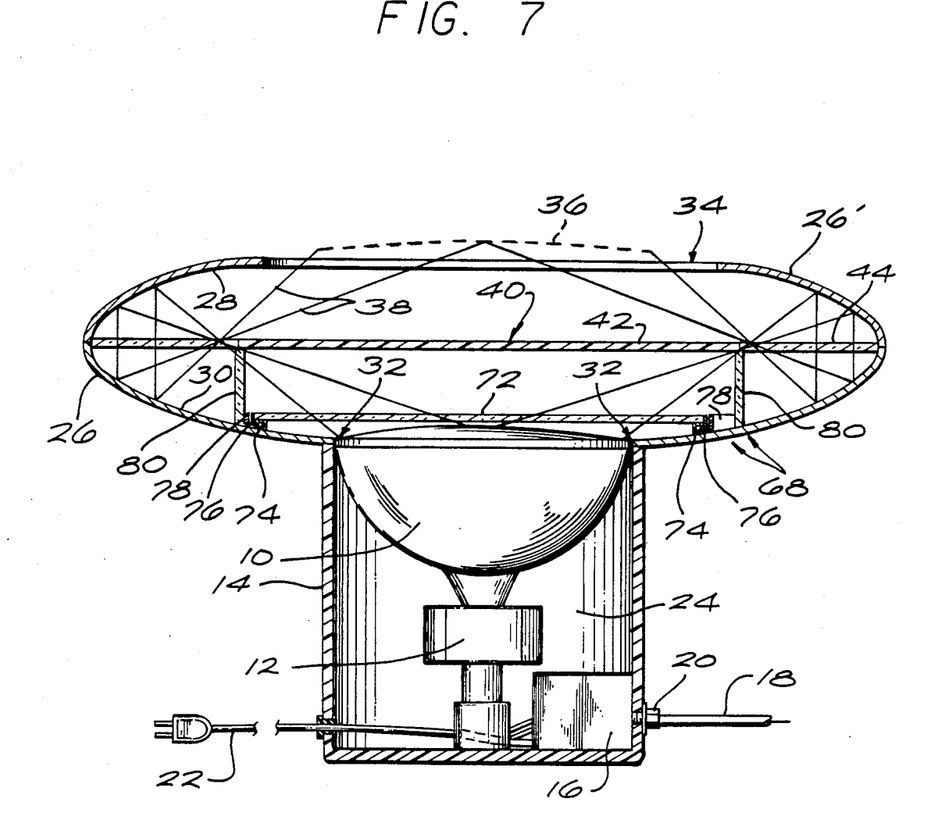
FIG. 7 is a cross-sectional view of the polarized light 360° viewing system shown in FIG. 6, taken generally along the line 7—7 of FIG. 6.

A second preferred embodiment is illustrated in FIGS. 6 and 7. This embodiment is similar to that illustrated in FIGS. 1 through 4, with the exception that the stationary polarized screen 80 is repositioned between the upper and lower mirrors 26 and 26' from the prior configuration shown wherein it overlies the real image in space 36 atop the upper mirror 26'. In particular, in the embodiment of FIGS. 6 and 7 the stationary polarized screen 80 is positioned to intercept light from the CRT 10 as it passes through the rotatable polarized screen 72 and before it is reflected from the first mirrored surface 28. This is accomplished by positioning the stationary polarized screen 80 directly between the plate 40 and the second mirrored surface 30 at the interface between the opaque portion 42 and the rim portion 44 of the plate. This results in the stationary polarized screen 80 having a generally cylindrical configuration.

As described above, the stationary polarized screen 80 and the rotatable polarized screen 72 cooperate to define a window through which the real image in space 36 may be viewed, which rotates in synchronization with the real image in space.

Figure 8:
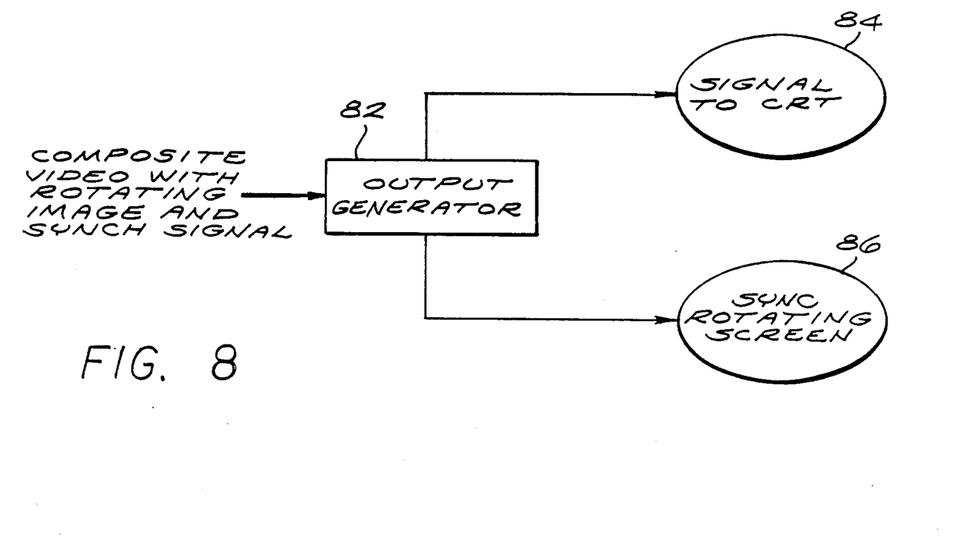
FIG. 8 is a logic diagram illustrating the simplified processing of a composite video signal provided with a pre-recorded rotating image and sync signal.

Although the invention has been described in a manner providing for the electronic rotation of the input composite video signal (FIG. 5), the invention is equally applicable for use with an input composite video having a pre-recorded rotating image. As illustrated in FIG. 8, such an input composite video signal having a rotating image would preferably also be provided with a pre-recorded signal which could be detected by a simplified output generator circuit 82, which splits the input signal into two outputs. One output would be a signal 84 to the CRT, and the other output would be a sync rotating screen signal 86 which would activate the induction motor 78 to turn the rotatable polarized screen 72 in synchronization with the prerecorded rotating image.

From the foregoing it will be appreciated that the 360° viewing system of the present invention can be placed in a central location, such as on top of a conference table, about which are seated a number of persons who wish to view a picture. As the electronic image rotation system electronically rotates an image upon the CRT 10 at a rate greater than 900 revolutions per minute, the optical system projects the rotating image to create the rotating real image in space 36. The rapid rotational rate in synchronization with operation of the polarized shutter system, results in each viewer seeing the picture clearly and distinctly each time that it is aligned with the viewer's line of sight so that in effect, an entire group of gathered persons can view the same picture simultaneously.

While a particular form of the invention has been illustrated and described, it will be apparent that various modifications can be made without departing from the spirit and scope of the invention. Accordingly, it is not intended that the invention be limited, except as by the appended claims.

We claim:

1. A 360° viewing system, comprising:
 an optical system for continuously projecting a real image in space;
 means for rotating the real image in space at a given number of revolutions per minute; and
 a polarized light shutter including a rotatable polarized screen which rotates in synchronization with the rotating real image in space, and a stationary polarized screen positioned such that the real image in space may be viewed externally of the 360° viewing system only when the polarities of the two polarized screens match, wherein the rotatable and stationary polarized screens are configured to permit the real image in space to be viewed in a selected orientation at all points about the 360° viewing system.

2. A system as set forth in claim 1, wherein the real image in space is rotated at a speed of at least 900 revolutions per minute.

3. A system as set forth in claim 1, wherein the optical system includes a stationary cathode ray tube, and wherein the image created thereon is rotated electronically.

4. A system as set forth in claim 3, wherein the cathode ray tube is positioned within a housing.

5. A system as set forth in claim 1, wherein the optical system includes facing first and second concave mirrored surfaces.

6. A system as set forth in claim 5, wherein the first and second mirrored surfaces are provided by a pair of parabolic mirrors disposed above a stationary cathode ray tube.

7. A system as set forth in claim 6, wherein the real image in space is projected above the pair of parabolic mirrors.

8. A system as set forth in claim 6, wherein a partially opaque plate is disposed between the stationary ray tube and the real image in space such that the stationary cathode ray tube is not directly visible when viewing the real image in space.

9. A system as set forth in claim 8, wherein the opaque plate is positioned between the pair of parabolic mirrors and includes a transparent outer rim through which the first and second mirrored surfaces reflect light to create the real image in space.

10. A system as set forth in claim 6, wherein the rotatable polarized screen generally overlies the stationary cathode ray tube to intercept light emitted therefrom prior to reflection by the pair of parabolic mirrors.

11. A system as set forth in claim 10, wherein the rotatable polarized screen includes a plurality of magnets positioned about its periphery, which magnets are arranged to have alternating polarities, and wherein the rotating polarized screen is rotated by an induction motor.

12. A system as set forth in claim 10, wherein the stationary polarized screen exteriorly surrounds the real image in space.

13. A system as set forth in claim 12, wherein the stationary polarized screen has a generally conical configuration.

14. A system as set forth in claim 10, wherein the stationary polarized screen is situated between the pair of parabolic mirrors.

15. A system as set forth in claim 14, wherein the stationary polarized screen has a generally cylindrical configuration.

16. A 360° viewing apparatus, comprising:
means for creating an image;
means for polarizing light from the image;
a pair of facing parabolic mirrors configured for projecting the polarized image to create a polarized real image in space;
means for rotating the polarized real image in space while maintaining consistent polarization of the polarized real image in space as it is rotated; and
means for causing the polarized real image in space to be viewed intermittently each revolution thereof by any one viewer about the 360° viewing system, such that all viewers will see the same polarized real image in space substantially simultaneously and continuously, wherein the means for causing the polarized image in space to be viewed intermittently each revolution thereof includes a polarized light shutter comprising a stationary polarized screen positioned with respect to the rotating polarized real image in space such that the polarized real image in space may be viewed at any one point externally of the 360° viewing apparatus only when the polarities of the polarized real image in space and the stationary polarized screen match.

17. An apparatus as set forth in claim 16, wherein the means for polarizing light from the image includes a rotatable polarized screen which rotates in synchronization with rotation of the real image in space.

18. An apparatus as set forth in claim 17, wherein the rotatable polarized screen generally overlies the means for creating an image, to intercept light emitted therefrom prior to reflection by the pair of parabolic mirrors.

19. An apparatus as set forth in claim 17, wherein the rotatable polarized screen is driven by an induction motor.

20. An apparatus as set forth in claim 16, wherein the stationary polarized screen exteriorly surrounds the real image in space.

21. An apparatus as set forth in claim 16, wherein the stationary polarized screen is situated generally between the pair of facing parabolic mirrors.

22. A method of presenting an image to an audience generally surrounding the image, such that all viewers see the same image substantially simultaneously, the steps comprising:
providing a rotating image;
projecting the rotating image to create a rotating real image in space; and
presenting a window in a normally opaque shutter system, which shutter system permits and denies visibility of the rotating real image in space, and rotating the window about the shutter system in synchronization with rotation of the real image in space such that the window is continually aligned with the rotating real image in space, wherein the step of presenting a window includes providing means rotatable with the rotating image, for polarizing light of the image, and providing a stationary polarized screen which, together with the rotatable means for polarizing light of the image, presents a normally opaque shutter system, wherein a window is formed in the stationary polarized screen only as the polarities of the stationary screen and the polarized light of the image align with one another.

* * * * *